United States Patent [19]

Kiczek

[11] Patent Number: 5,220,803
[45] Date of Patent: Jun. 22, 1993

[54] CRYO-MECHANICAL SYSTEM FOR REDUCING DEHYDRATION DURING FREEZING OF FOODSTUFFS

[75] Inventor: Edward F. Kiczek, Long Valley, N.J.

[73] Assignee: Air Products and Chemicals, Inc., Allentown, Pa.

[21] Appl. No.: 789,247

[22] Filed: Nov. 7, 1991

[51] Int. Cl.$^5$ ............................................. F25D 13/06
[52] U.S. Cl. ........................................... 62/63; 62/64; 62/378; 62/380; 62/381
[58] Field of Search ............... 62/62, 63, 64, 381, 62/374, 380, 332

[56] References Cited

U.S. PATENT DOCUMENTS

| | | | |
|---|---|---|---|
| 3,485,055 | 12/1969 | Webster | 62/65 X |
| 3,507,128 | 4/1970 | Murphy | 62/332 X |
| 3,774,524 | 11/1973 | Howard | 62/64 X |
| 4,866,946 | 9/1989 | Klee | 62/381 X |

Primary Examiner—Allen J. Flanigan
Attorney, Agent, or Firm—James C. Simmons; William F. Marsh

[57] ABSTRACT

Method and apparatus for reducing dehydration during freezing of foodstuffs utilizing a combination of cryogenic freezing to lock in moisture followed by vaporized cryogen assisted mechanical freezing to through freeze other foodstuff.

2 Claims, 2 Drawing Sheets

CRYO-MECHANICAL SYSTEM FOR REDUCING DEHYDRATION DURING FREEZING OF FOODSTUFFS

FIELD OF THE INVENTION

The present invention pertains to combining cryogenic freezing and mechanical refrigeration to freeze foodstuffs.

BACKGROUND OF THE INVENTION

Attempts have been made in the past to combine use of a cryogenic freezing process prior to mechanical refrigeration to freeze food products. The so called hybrid systems boost overall production, reduce dehydration to some extent, but increase the freezing costs. In order to use a hybrid system attempts have been made to utilize the vaporizing cryogen in the mechanical refrigeration system to enhance the mechanical refrigerator. U.S. Pat. Nos. 4,856,285 and 4,858,445 disclose and claim devices to utilize vaporized cryogen by heat exchanging the vaporizing cryogen against the atmosphere in the mechanical refrigeration unit by means of a separate heat exchanger. Such devices require extensive equipment and the heat transfer is not as effective as could be accomplished with a direct heat exchange.

SUMMARY OF THE INVENTION

According to the present invention, an improved hybrid freezing system is achieved by mating the outlet of an immersion type cryogenic freezer to the inlet of a spiral type mechanical freezer. Cryogen vaporizing in the immersion unit is directly injected into the mechanical refrigerator, where the cryogen is in direct heat exchange with refrigerated air circulating inside the mechanical refrigerator. Vaporized cryogen injected into the spiral portion of the hybrid unit is exhausted through the exit end of the spiral freezer by means of a controlled exhaust fan. Key to the refrigeration system is the movement of identical volumes of vaporized cryogen into and out of the mechanical refrigeration unit. Hybrid systems according to the present invention provide the benefits of cryogenic freezing because initial quick freezing of the product forms a crust on the product and therefore minimizes or lowers the dehydration of the finally frozen product and the cryogen assisted mechanical refrigeration system has the benefit of lower cost to finally freeze the product completely.

DETAILED DESCRIPTION OF THE INVENTION

Figure 1:
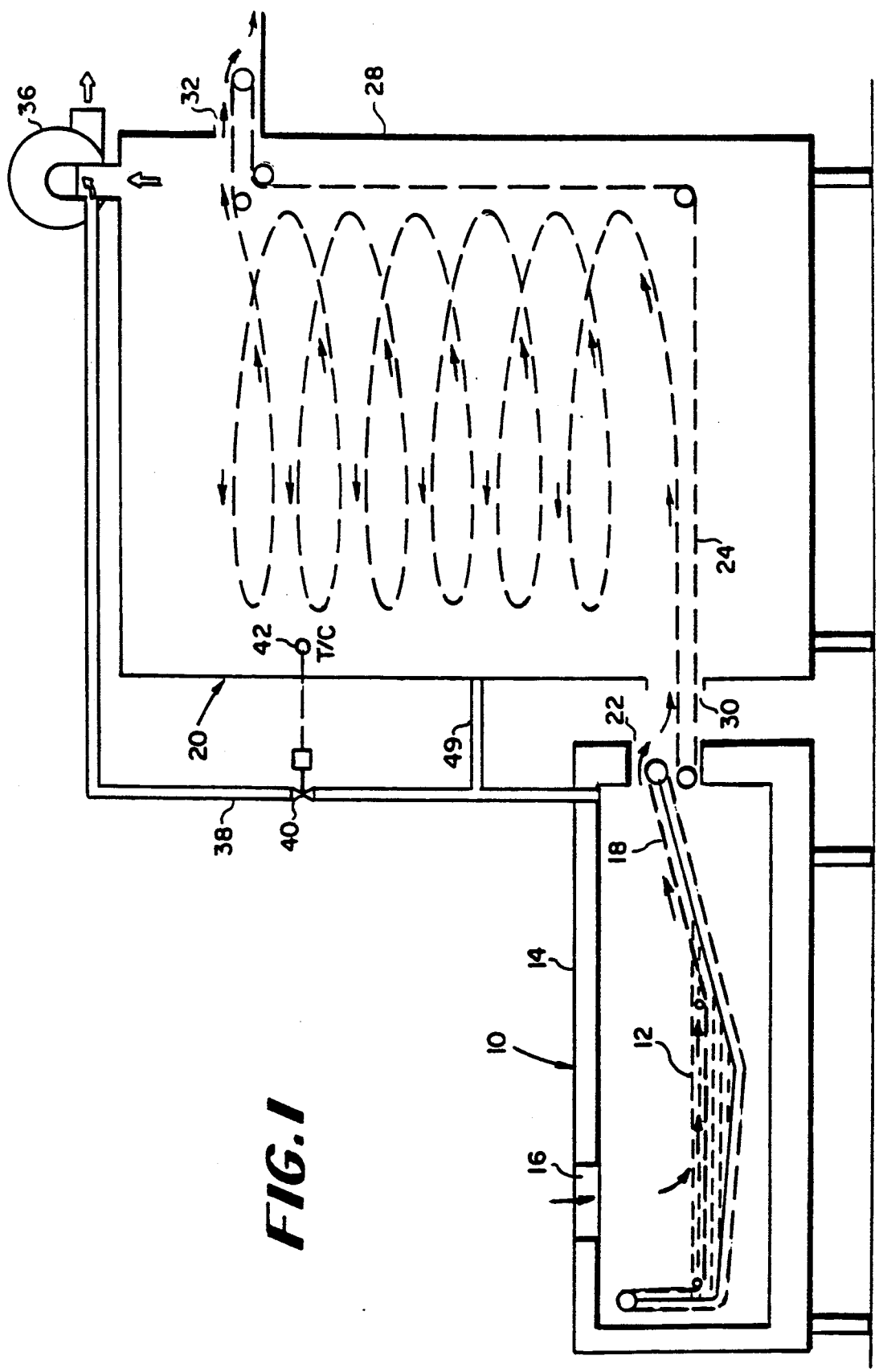
FIG. 1 is a schematic representation of an apparatus according to the present invention.

Referring to FIG. 1, the apparatus of the present invention comprises a first section 10 which is an immersion type freezer of the type adapted to maintain a pool of liquid cryogen (e.g. nitrogen) 12 inside an insulated enclosure 14. First section or immersion freezer 10 includes a product inlet 16 adapted to permit product shown by arrows 17 to be introduced into the liquid cryogen bath 12. A continuous conveyor 18 driven by a belt drive 20 as is known in the art is positioned to move product (e.g. foodstuffs) from the bath toward a discharge 22 in section 10. Discharge 22 is adapted to discharge product onto a spiral conveyor 24 contained inside a second section 26 which is a spiral type mechanically refrigerated freezer. Mechanical spiral type refrigerators such as 26 are well known in the art and comprise a refrigerated housing 28, a product inlet 30 at a low level, and a product discharge 32 at a higher level. The product to be frozen moves from the inlet 30 around the spiral and is discharged out of the discharge opening 32. The interior of the housing 28 is cooled to freezing temperatures by means of a mechanical refrigeration system (not shown) as is well known in the art. Sections 10 and 26 are mated or married together in a gas tight relationship so that cryogen vaporizing inside of the immersion freezer 10 will flow out of the discharge 22 and into the housing 28 of mechanical refrigerator 26. Movement of the vaporized cryogen is effected by a cryogen mover 36 which can be an exhaust fan. The exhaust fan is so constructed that equal volumes of cryogen are admitted through the gas inlet 49 of freezer 26 and discharged from outlet 32 of freezer 26. Flow of vaporized cryogen is as shown by arrows 50. The exhaust fan includes a bypass system 38 which includes a temperature control valve 40 with a thermocouple connected to control valve 40 being disposed inside of the freezer 26. In order to maintain the correct volumetric flow of vaporized cryogen, injection of vaporized cryogen into the refrigerator 26 is in response to the temperature control and positioning of valve 40.

The product to be frozen is introduced into the immersion unit through aperture 16 where the product is permitted to drop into and remain in the liquid cryogen (e.g. liquid nitrogen) bath for a time sufficient to produce a frozen crust on the outside surface of the product or article to be frozen. Immersion usually persists for a period of from 1 to 20 seconds depending upon the product being frozen. The product is then discharged from the liquid nitrogen bath or pool 12 to the mechanical refrigeration unit 26 to finish the freezing process. Boil-off gas (vaporized cryogen) from the immersion freezer 10 is directly injected into the mechanical refrigeration unit 26 for contact with the food to efficiently and effectively utilize both the vaporized cryogen and the air recirculating inside the freezer. The vaporized cryogen is drawn off or exhausted from the product discharge 32 of the spiral freezing 26 utilizing the exhaust fan 36 at the exit.

The system of the present invention is limited to approximately 30% of the total product duty being handled by cryogenics so as not to override the mechanical refrigeration control system.

Set forth in Table 1 are the results of an economic analysis for freezing chicken according to the method and apparatus of the present invention.

TABLE 1

| BTU[1] REMOVAL/LB | INCREASE IN PRODUCTION | EXPECTED DEHYDRATION | DEHYDRATION[2] SAVINGS ¢/LB | EXPECTED[3] OPERATING SAVINGS ¢/LB |
|---|---|---|---|---|
| 25 | 14% | 2.0% | 2.4¢ | 1.15¢ |

TABLE 1-continued

| BTU[1] REMOVAL/LB | INCREASE IN PRODUCTION | EXPECTED DEHYDRATION | DEHYDRATION[2] SAVINGS ¢/LB | EXPECTED[3] OPERATING SAVINGS ¢/LB |
|---|---|---|---|---|
| 45 | 26% | 1.3% | 3.8¢ | 1.65¢ |
| 64 | 36% | 0.8% | 4.8¢ | 1.75¢ |

[1]Total product BTU removal required, 170 BTU/lb.
[2]Based on 3.2% on current operation, expected dehydration (laboratory simulation) and $2.00/lb product value.
[3](Dehydration Savings) + (Reduction in Mechanical Refrigeration Cost) − (LIN Cost to Crust Freeze)

Figure 2:
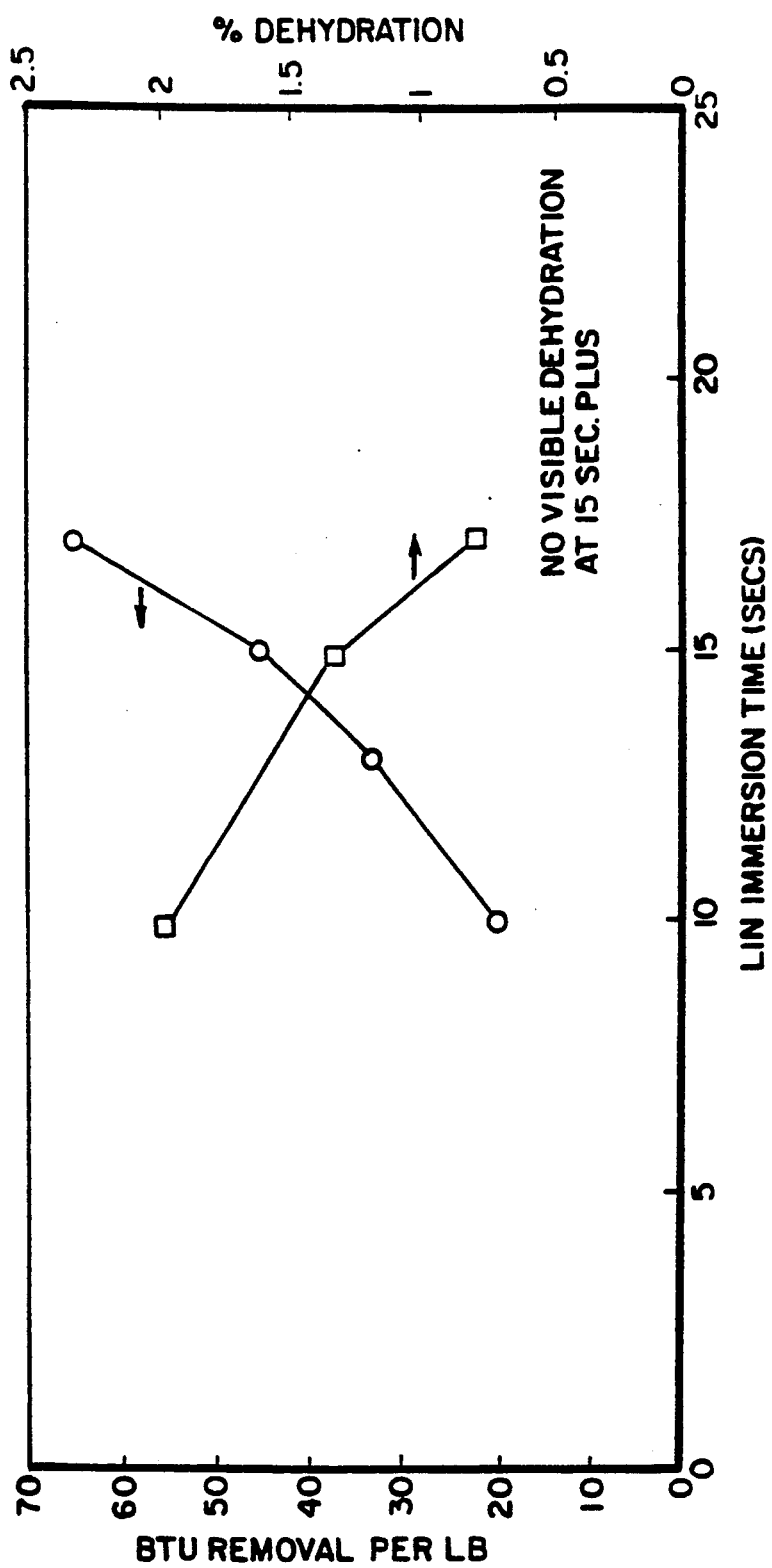
FIG. 2 is a plot of immersion time against both heat removal per pound and percent dehydration for a hot chicken product frozen according to the process of the present invention.

Plotted in FIG. 2 are the results of tests of immersion time in liquid cryogen against heat removal per pound which is shown as curve A and a plot of percent dehydration against liquid cryogen immersion time in seconds which is shown as curve B for a hot chicken product.

The process and apparatus according to the present invention results in the benefit of the lower cost of mechanical refrigeration, without consideration for dehydration, to freeze then to achieve the same level of freezing using a cryogenic freezer. However, because most mechanically frozen products dehydrate one, two, four percent more than cryogenically frozen products, the integration of cryogenics into a mechanical freezer to lower dehydration such as taught by the present invention provides a method and apparatus heretofore unknown in the prior art.

Thus, according to the present invention the benefits of cryogenic freezing are realized with the lower cost of mechanical refrigeration. The benefit of cryogenic freezing comes about by reducing the amount of dehydration of the product or product moisture loss while freezing. Dehydration is strictly a time-temperature freezing rate phenomenon. By integrating the two systems, it is possible to first crust freeze the product to lock in the moisture then finish the freeze in a mechanical refrigeration unit which uses by direct heat exchange the vaporized cryogen from the cryogenic unit.

The process according to the present invention provides a 30% production increase depending upon the product being frozen. This is the heat value removed by the cryogenic system during crust freezing and off-gas supplement in the mechanical freezing unit. In addition, it is expected that with lower dehydration the mechanical unit will experience less moisture build-up in the coils, easier belt clean-up and consequently longer run times between necessary shutdown for cleaning.

Laboratory and field tests have shown that dehydration for hot products can be upwards of 4%, and 2% for cold products. With the cryomechanical system, dehydrations of 0.8% for hot products and 0.35% for cold products were measured, respectively. This results in net product weight retention which can more than pay for nitrogen costs depending on product value per pound.

Having thus described my invention what is desired to be secured by letters patent of the United States is set forth in the appended claims.

I claim:

1. A system for freezing foodstuffs comprising in combination:

a first section being an immersion type cryogenic freezer of the type having means to admit product to be frozen into a bath of liquid cryogen and means to move said product from said bath to an exit end of said first section;

a second section being a spiral type mechanical freezer having a first or entry end at a lower level and a second or exit end at a higher level, said entry end of said mechanical freezer mated to said exit end of said first section in a gas tight relationship, said second section so constructed and arranged to receive product from said first section for movement through said second section from said entry end to said exit end; and means associated with said exit end of said second section to move vaporized cryogen from said first section through said second section to mix directly with refrigerated air recirculated in said second section said means adapted to move equal volumes of gas from said first section into and out of said second section whereby a maximum of thirty percent of the refrigeration duty in the second section is provided by movement of vaporized cryogen through said second section, said means to move vaporized cryogen through said second section includes means to by-pass or divert a portion of the vaporized cryogen from passing through said second section, said by-pass means include a temperature controlled valve activated by a thermocouple in said second section.

2. An apparatus according to claim 1 wherein said means for moving vaporized cryogen is an exhaust blower.

* * * * *